(12) United States Patent
Kwak et al.

(10) Patent No.: US 10,433,679 B2
(45) Date of Patent: Oct. 8, 2019

(54) TUB RECEPTACLE AND BATHING SLING

(71) Applicant: Skip Hop, Inc., New York, NY (US)

(72) Inventors: Albert Kwak, Long Island City, NY (US); Chelsea Carter, Jersey City, NJ (US); Ben Bearsch, Brooklyn, NY (US); Ellen Diamant, New York, NY (US)

(73) Assignee: SKIP HOP, INC., New York, NY (US)

( * ) Notice: Subject to any disclaimer, the term of this patent is extended or adjusted under 35 U.S.C. 154(b) by 21 days.

(21) Appl. No.: 15/445,210

(22) Filed: Feb. 28, 2017

(65) Prior Publication Data

US 2018/0242793 A1 Aug. 30, 2018

(51) Int. Cl.
*A47K 3/024* (2006.01)
*A47K 1/14* (2006.01)
*A47K 3/12* (2006.01)
*F16B 2/22* (2006.01)

(52) U.S. Cl.
CPC .............. *A47K 3/024* (2013.01); *A47K 1/14* (2013.01); *A47K 3/127* (2013.01); *F16B 2/22* (2013.01)

(58) Field of Classification Search
CPC ........ A47K 3/024; A47K 3/034; A47K 3/074; A47K 3/127; F16B 2/22
USPC ........................................... 4/572.1; D23/278
See application file for complete search history.

(56) References Cited

U.S. PATENT DOCUMENTS

| | | |
|---|---|---|
| 1,450,827 A | 4/1923 | Wood |
| 1,734,462 A | 11/1929 | Gottlieb |
| 2,607,925 A | 8/1952 | De Puy |
| 2,722,483 A | 11/1955 | Kennedy |
| 2,836,833 A | 6/1958 | Carlson |
| D251,303 S | 3/1979 | Boissonneault |
| 4,881,281 A | 11/1989 | Lavoine et al. |
| 5,181,284 A | 1/1993 | Raphael et al. |
| 5,276,926 A | 1/1994 | Lopez |
| 5,297,300 A | 3/1994 | Sheu |
| D350,598 S | 9/1994 | Wise et al. |

(Continued)

FOREIGN PATENT DOCUMENTS

| | | |
|---|---|---|
| AU | 644771 | 12/1993 |
| CH | 561534 | 5/1975 |

(Continued)

OTHER PUBLICATIONS

Extended European Search Report dated Jun. 22, 2018 in corresponding European Patent Application No. 18158979.7.

*Primary Examiner* — Tuan N Nguyen
(74) *Attorney, Agent, or Firm* — Stephen J. Weyer, Esq.; James R. Hayne, Esq.; Stites & Harbison, PLLC

(57) ABSTRACT

A tub receptacle and sling for bathing an infant has at least two configurations. The tub receptacle includes a first pair of fasteners positioned opposite each other near the foot end of the tub, and a second pair of fasteners positioned opposite each other closer to the head end of the tub. The sling includes an upper pair of fasteners that attach to the tub near the head end, and a lower pair of fasteners that may attached either at the first pair of fasteners or the second pair of fasteners. In a first configuration, the fasteners are attached to the tub at the first pair of receivers and an infant on the sling is fully supported by the sling. In a second configuration, the fasteners are attached to the tub at the second pair of receivers and an infant in the tub is partially supported by the sling and partially supported by the interior surface of the tub.

8 Claims, 10 Drawing Sheets

(56) References Cited

U.S. PATENT DOCUMENTS

| | | |
|---|---|---|
| 5,361,430 A | 11/1994 | Wise |
| 5,406,655 A | 4/1995 | Sahlin |
| 5,491,850 A | 2/1996 | Kiesser |
| 5,588,159 A | 12/1996 | Poulson et al. |
| D422,345 S | 4/2000 | Dixon |
| 6,112,343 A | 9/2000 | Dixon |
| 6,243,890 B1 | 6/2001 | Yang |
| 7,430,769 B2 | 10/2008 | Davis |
| D632,109 S | 2/2011 | Baron |
| 8,302,218 B2 | 11/2012 | Dignitti et al. |
| 2008/0295239 A1 | 12/2008 | Ristuccia et al. |
| 2014/0259360 A1 | 9/2014 | Yu et al. |

FOREIGN PATENT DOCUMENTS

| | | |
|---|---|---|
| CN | 201782669 | 4/2011 |
| CN | 203676938 | 7/2014 |
| CN | 204427882 | 7/2015 |
| CN | 105316576 | 2/2016 |
| EP | 0253065 | 1/1988 |
| EP | 2133015 | 12/2009 |
| GB | 21278 | 8/1894 |
| GB | 190402059 | 3/1904 |
| JP | S50 57739 | 5/1975 |
| JP | S52 4053 | 1/1977 |
| JP | S-55130627 | 10/1980 |
| KR | 20050016784 | 2/2005 |
| KR | 20140102906 | 5/2014 |
| KR | 20140005253 | 10/2014 |
| SE | 5289 | 3/1894 |
| WO | WO-03103467 | 12/2003 |
| WO | WO-2011023098 | 3/2011 |

TUB RECEPTACLE AND BATHING SLING

FIELD OF THE INVENTION

The present invention relates to a tub for bathing an infant and more particularly to a bathing tub receptacle with an adjustable sling.

BACKGROUND OF THE INVENTION

Bathing tubs are often used to bathe infants because they allow a small amount of water to be used and further allow parents more access to the infant than would be possible if using a typical bathtub. The tub may be filled with a small amount of water and the infant may be bathed at a comfortable location for the parent, such as on a countertop, near a sink, and/or other location that allows the parent to conveniently bathe the infant while ensuring the infant is safe from water hazards, such as choking and/or becoming submerged during the bath. However, as an infant grows, parents may require different needs in a bathing receptacle, such child support requirements. A new-born infant, for example, may require complete support during a bath. As the infant grows, less support may be needed as children are better able to support themselves.

SUMMARY OF THE INVENTION

The present invention is directed to a bathing tub which advantageously allows a parent to adjust the support of an attached sling as the support needs of the infant change. The invention is comprised of a tub receptacle and a sling that attaches to the tub receptacle in at least two positions or configurations. In a first position, the sling is configured to fully support an infant. In a second position, the sling is configured to partially support the infant and includes a back support roll at the base of the sling.

In one exemplary embodiment of the present invention, a tub receptacle includes a wall with an exterior surface and an interior surface, the wall defining a head end, a foot end, a right side, and a left side of the tub receptacle and constructed to receive a depth of water. The interior surface and the bottom of the receptacle may form a support surface, which may support either an infant in the tub or at least a portion of the sling when the sling is attached to the tub. The tub further includes a first pair of slots positioned on the right side and on the left side of the tub receptacle opposite each other and near the foot end of the tub receptacle, and a second pair of slots positioned on the right side of the tub receptacle and on the left side of the tub receptacle opposite each other and located closer to the head end of the tub than the first pair of slots. An adjustable sling is connectable to the tub, the sling including a sheet, a right upper clip and a left upper clip attached to the sheet and configured to attach to the wall near the head end of the tub receptacle; and a right lower clip and a left lower clip attached to the sheet, wherein the lower clips are each adapted to fit into both the first pair of slots and the second pair of slots. When the lower clips are inserted into the first set of slots, the sheet is fully supported by the upper clips and lower clips. Alternatively, when the lower clips are inserted into the second set of slots, the sheet is supported by the upper clips and the tub receptacle, and held in place by the lower clips.

In some embodiments, the sling may further include a right loop and a left loop attached to the sling adjacent to each of the lower clips. The bottom of the sheet may be rollable toward the top of the sheet to form a back support roll. The right lower clip may then be inserted into the right loop and the left lower clip may be inserted into the left loop before attaching the clips into the second pair of slots to form the partial support. The two upper clips of the sling may attach to the lip of the wall to complete the support of the sling by the tub.

BRIEF DESCRIPTION OF THE DRAWINGS

The present invention will now be described with regard to the figures as identified below.

DETAILED DESCRIPTION

Figure 2:
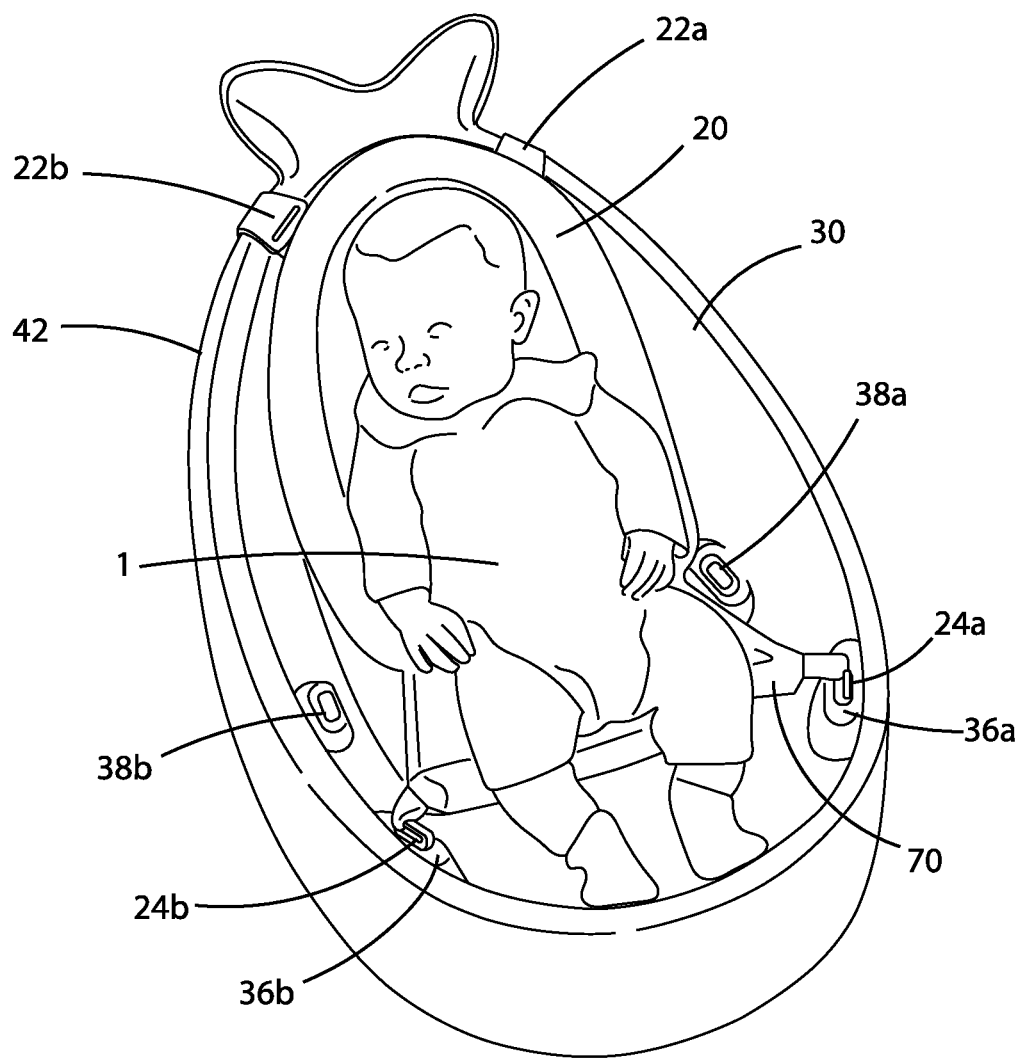
FIG. 2 is a perspective view of the tub of FIG. 1 illustrating an infant supported by the sling in a first configuration.

The present invention will now be described with regard to the Figures. Referring to the Figures generally, the present invention is a tub 10 comprised of a receptacle 30 and a sling 20. The sling 20 includes four fasteners, each in one of the corners of the sling: upper left fastener (e.g., clip 22a), upper right fastener (e.g., clip 22b), lower left fastener (e.g., clip 24a), and lower right fastener (e.g., clip 24b). The upper fasteners attach to the upper end of the receptacle 30 to support the upper portion of the sling 20. The lower complementary fasteners are attachable to the receptacle 30 in two different positions or configurations. In a first position, as illustrated in FIG. 2 and described in greater detail below, an infant 1 that is placed on the sling is fully supported by the sling 20. In a second position, illustrated in FIG. 3 and described in greater detail below, an infant 1 that is placed on the sling 20 is partially supported by the sling 20 and partially supported by the base of the receptacle 30 (i.e., the infant's lower portion is resting on the bottom of the receptacle 30). As used herein, "fastener" refers to one or more components, which may be utilized together to attach the sling 20 to the receptacle. Hence, as described herein and illustrated in the Figures, the upper fasteners are clips 22a, 22b that may attach to a lip 42 on the wall of the receptacle 30. Further, the lower sling-side fasteners are clips 24a, 24b are receivable by receptacle-side fasteners (i.e., slots 36a, 36b, 38a, 38b) molded on the interior of the walls of the receptacle 30. However, other types of fasteners are possible and the illustrated and described fasteners are not meant to limit the scope of the invention.

Referring now specifically to FIGS. 1 and 4a to 4c, the tub 10 is comprised of a receptacle 30 and a sling 20. The receptacle 30 is comprised of a rigid material, such as plastic (e.g., poly propylene), and/or other water-resistant semi-rigid material, and is formed to receive a depth of water. The tub includes an exterior surface 40 and an interior surface 44, which are connected by a lip 42 that runs along the upper edge of the receptacle 30. The walls of the receptacle 30 define a head end 50 of the receptacle 30, a foot end 52, and a bottom 54. In an exemplary embodiment, the interior surface 44, the exterior surface 40, and the bottom 54 are a continuous molded piece of plastic to prevent any water that is present in the interior of the receptacle 30 to leak to the exterior. When a child is placed in the receptacle 30, the head of the child is placed toward the head end 50, and the feet of the child are placed toward the foot end 52 of the tub. The child is placed in the receptacle 30 on his or her back, in a supine position, with the right side of the child near right side 56 of the receptacle 30 and the left side of the child toward left side 58. In some embodiments, the interior surface 44 and/or bottom 54 may form a support wall along the interior head end 50 of the receptacle 30 to allow for the sling 20 and/or an infant in the receptacle 30 to have additional support.

Figure 1:
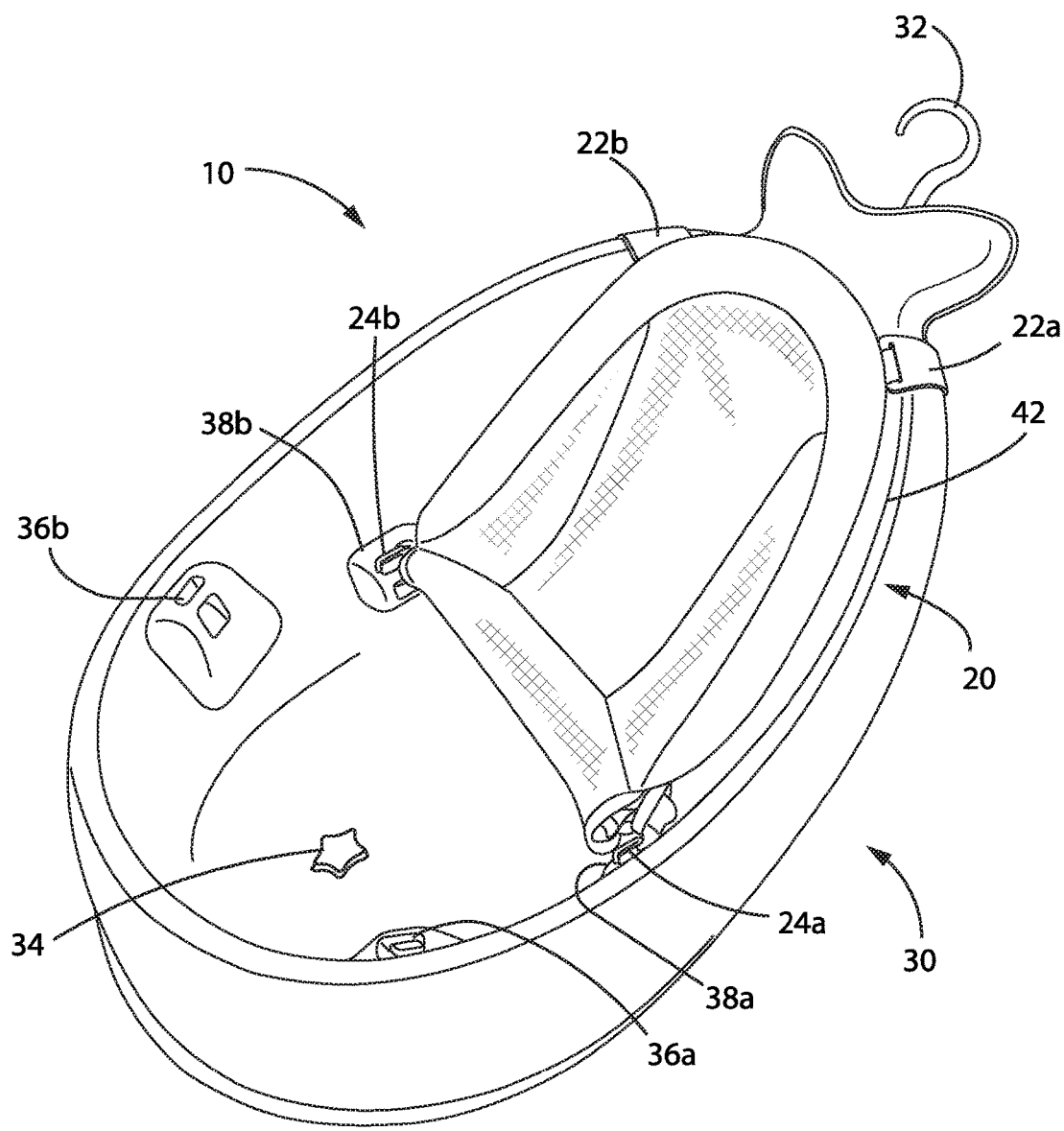
FIG. 1 is a perspective view of a tub comprised of a receptacle and a sling attached to the receptacle in accordance with one aspect of the present invention.

Sling 20 is a sheet, such as a water permeable mesh fabric, and includes a plurality of fasteners to attach the sling 20 to the receptacle 30. For example, as illustrated in FIG. 1, the fasteners include upper left clip 22a and upper right clip 22b, attached to the lip of receptacle 30; and lower left clip 24a and lower right clip 24b, which are attached to slot 38a and slot 38b, both molded into the inside of the receptacle 30. Additional slots 36a and 36b are also illustrated and, in a first configuration, clips 24a and 24b may be inserted into slots 36a and 36b. As illustrated, the sling 20 is in a second position, wherein an infant that is placed in the tub 10 will be partially supported by the sling 20 and partially supported by the receptacle 30.

Figure 6A:
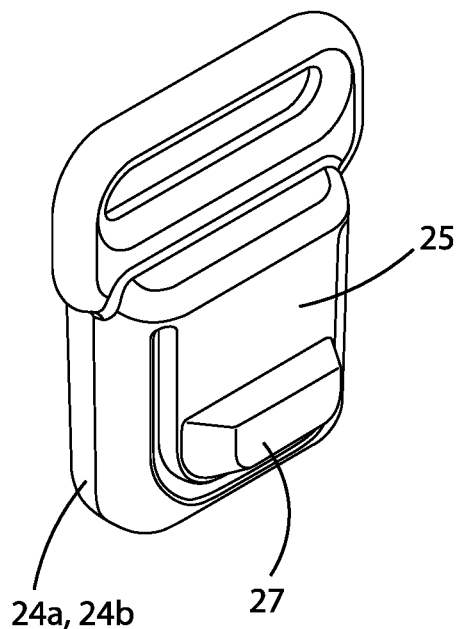
FIG. 6a is a perspective view of the front of the lower clips of the sling that are illustrated in FIG. 1.
Figure 6B:
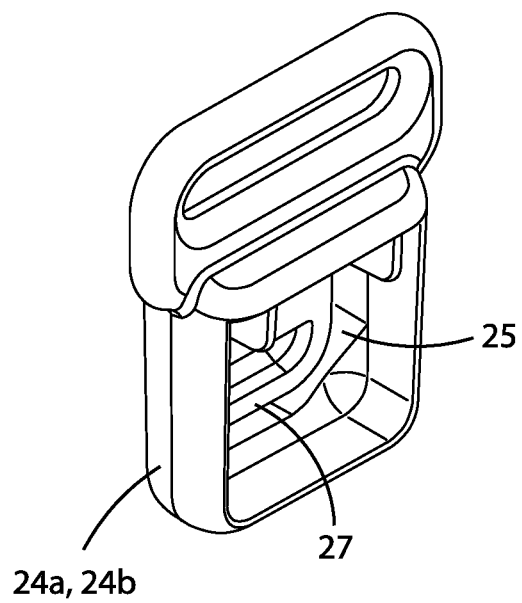
FIG. 6b is a second perspective view of the back of the lower clips that are illustrated in FIG. 1.

Referring to FIGS. 6a and 6b, Clips 24a, 24b are shown in greater detail. As illustrated in FIG. 6a, the lower clips 24a and 24b each have a deformable tab 25 that slightly collapses to allow the clips 24a, 24b to snugly fit in the slots 24a, 24b, 36a, 36b. When one of the clips is inserted into a corresponding slot, tab 25 slightly deforms and allows the clip to slip into the slot. Once inserted, tab 25 regains its original shape, thus allowing the tab to fit securely into the slot. Tongue 27 then fits snugly into an opening in the corresponding slot so as to slightly protrude while further locking the clip into place. When it is desirable to remove a clip from the slot, tongue 27 may be depressed, thus deforming the tab 25 again, and the clip 24a, 24b may be removed from the slot.

Figure 3:
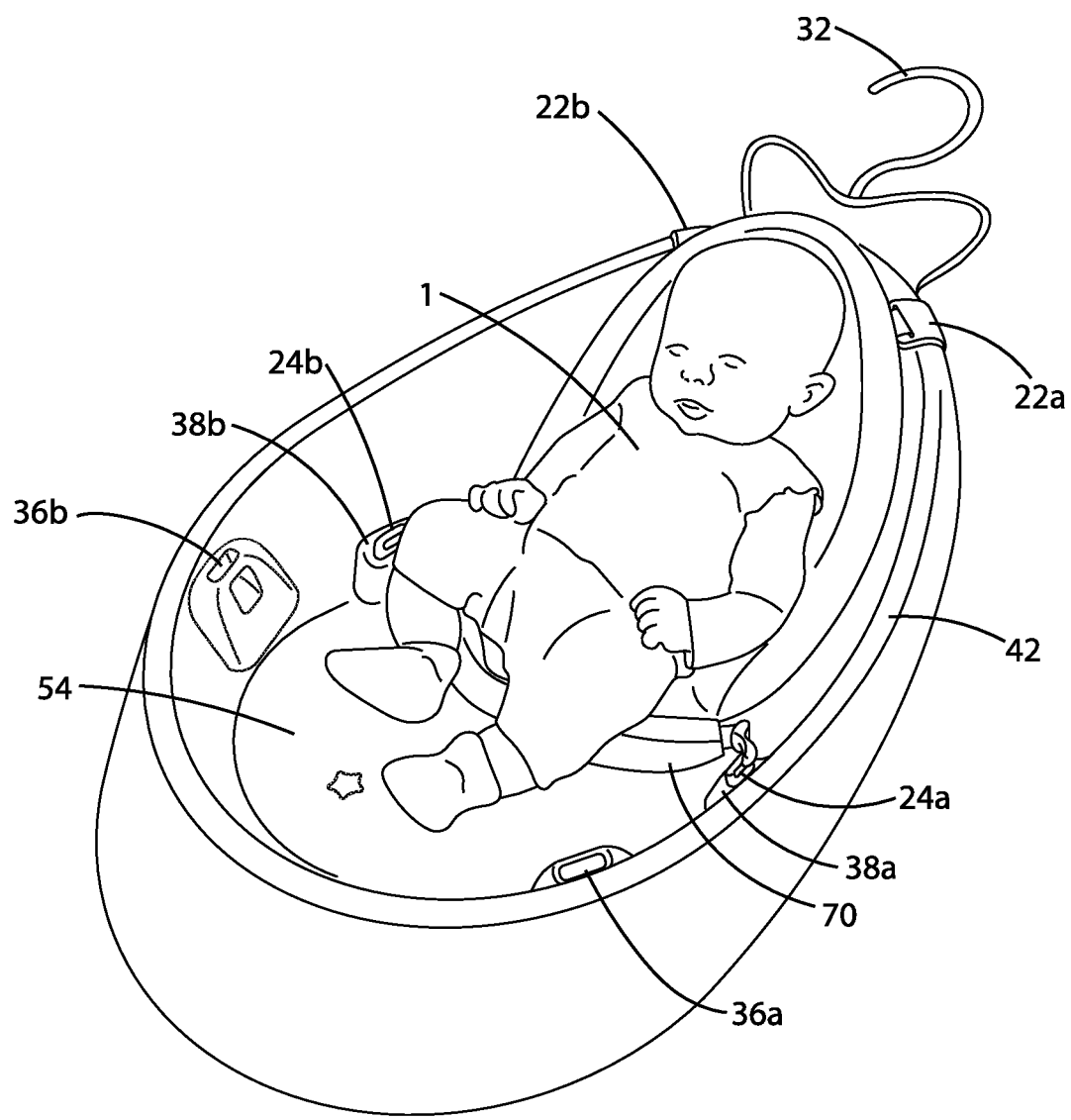
FIG. 3 is a perspective view of the tub of FIG. 1 illustrating an infant supported by the sling in a second configuration.

As illustrated in FIGS. 1 to 3, upper clips 22a and 22b may be attached to the sling 20 at a position closer to the head end than the foot end of the sling 20. The upper clips 22a and 22b are configured to attach to the receptacle 30 at locations opposite each other and closer to the head end 50 of the receptacle 30 than the foot end 52 of the tub. Referring to FIG. 1, upper left clip 22a and upper right clip 22b are configured to clip onto the lip 42 of the receptacle 30, with upper left clip 22a on the left side 58 and upper right clip 22b on the right side 56. When clipped onto the lip 42, the upper portion of the sling 20 is supported partially by the receptacle 30.

In some embodiments, sling 20 may include alternative types of fasteners and the receptacle 30 may include a complementary fastener to the type of fastener used on the sling 20. For example, instead of clips 24a and 24b, sling 20 may include receivers at strap 74 and 76; and the receptacle 30 may include clips or protrusions that may be inserted into the receivers that are connected to the sling 20. Further, alternative fasteners may be utilized without departing from the spirit of the disclosed invention. Thus, the clips of the sling 20 and the slots of the receptacle 30 may be replaced with alternative complementary types of fasteners combinations. For example, the sling 20 may attach to the receptacle 30 utilizing a button and hole to receive a button, opposite parts of a snap, strings that may be tied together, a loop of fabric and an object that is insertable snugly into the loop, complementary pieces of VELCRO, and/or other fastening means that may be attached to the sling 20 and receptacle 30 to allow the sling 20 to securely attach to the receptacle 30. Thus, alternative fastener combinations are contemplated as substitutions for the fasteners illustrated in the embodiments herein.

As illustrated, the receptacle 30 may include a draining hole with a stopper 34. The draining hole may extend through the bottom 54 of the receptacle 30 and when the stopper 34 is placed over the draining hole, any water that is in the receptacle 30 is prevented from draining out of the receptacle 30. The stopper 34 is attached such that it may be easily inserted before filling the receptacle 30 with water and easily removed when the bathing process is completed. For example, as illustrated in in FIG. 4c, the stopper 34 is inserted in an opening 54a in the bottom 54 of the receptacle. Further, the stopper 34 includes a protrusion 34a that is insertable into a second opening 54b in the bottom 54 of the receptacle 30. In operation, the stopper 34 is removable from opening 54a while staying secured movably in opening 54b. Thus, the opening 54a may open to allow water to drain from the receptacle 30 with the stopper 34 askew from the opening 54a while the stopper 34 is still partially attached to the receptacle 30 via the protrusion 34a of the stopper 34. In some embodiments, the stopper 34 may be attached to the receptacle 30 by a single protrusion or may be completely absent.

Figure 4A:
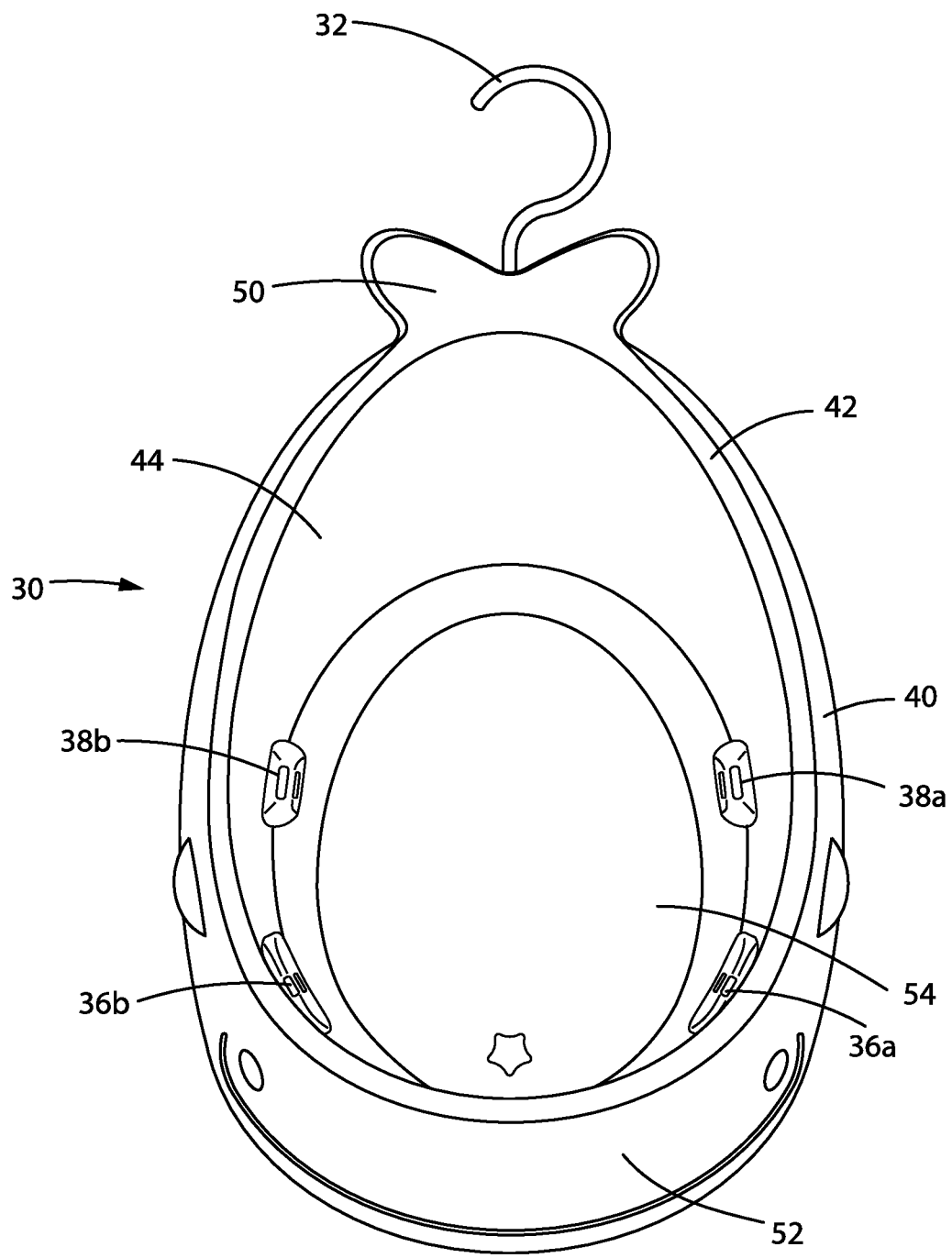
FIG. 4a is an overhead view of the receptacle that is illustrated in FIG. 1.
Figure 4B:
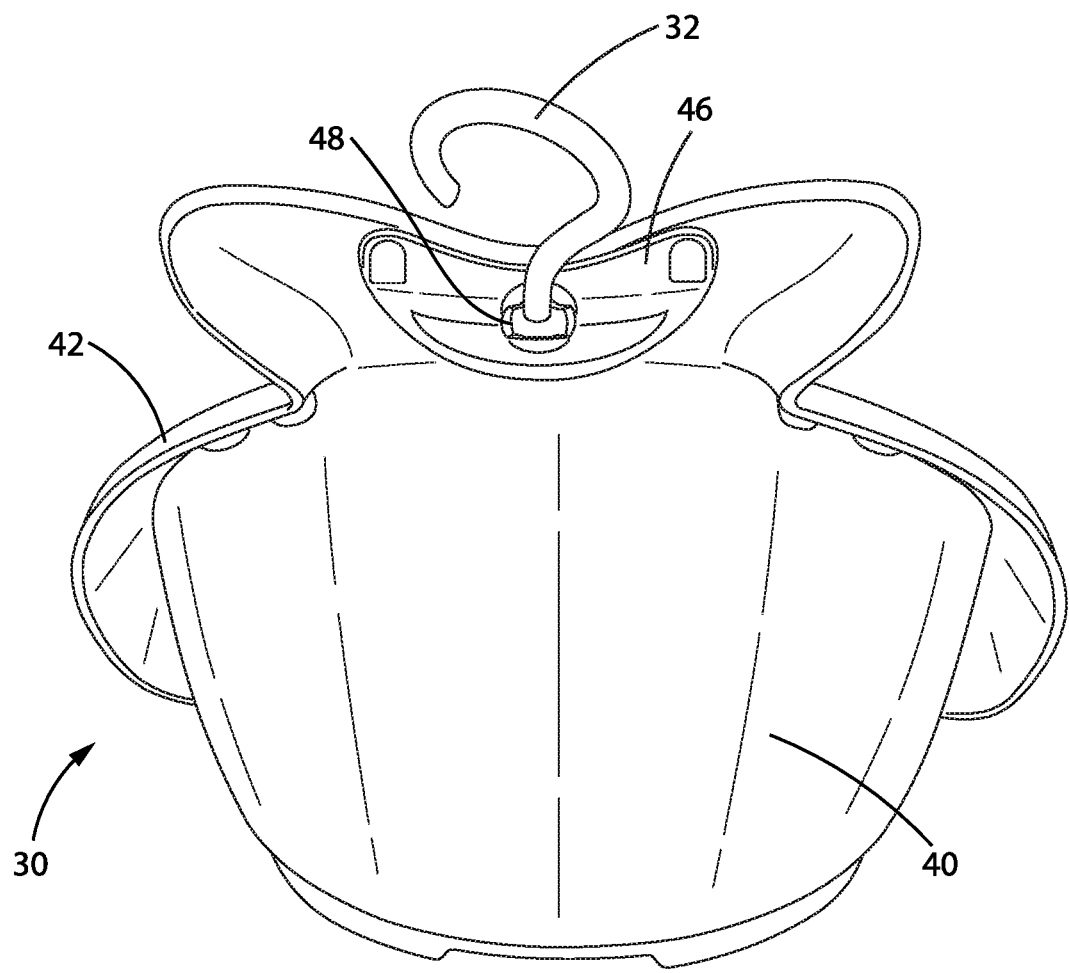
FIG. 4b is a back view of the receptacle that is illustrated in FIG. 1.
Figure 4C:
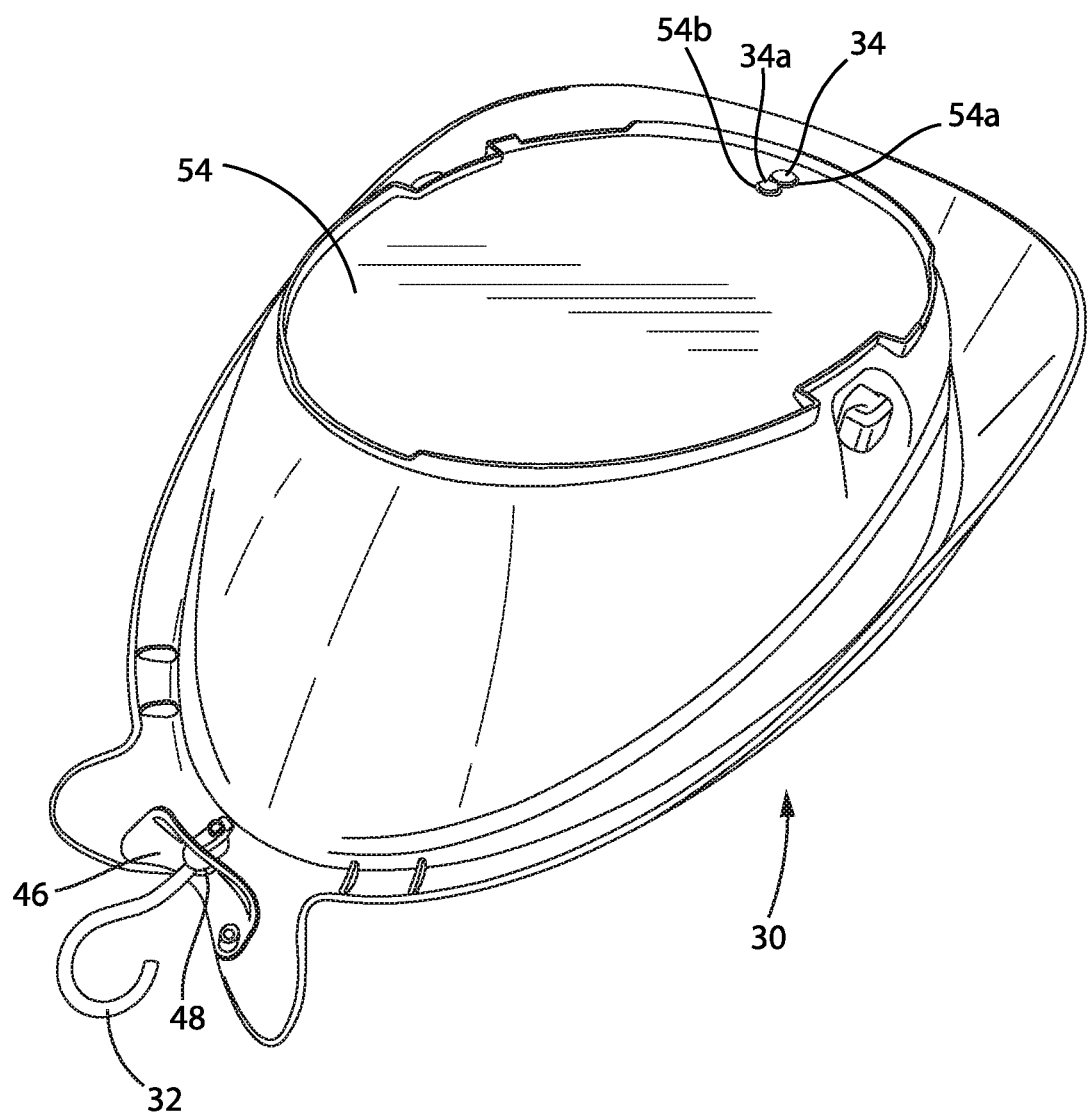
FIG. 4c is a bottom view of the receptacle that is illustrated in FIG. 1.

The receptacle 30 further includes a hook 32 that may be rotatably attached to the receptacle 30. As illustrated in FIG. 4b and FIG. 4c, the hook 32 is attached near the head end of the receptacle 30 by a ball joint 48 on the receptacle end of the hook 32. The ball joint 48 attaches to the receptacle 30 by an attachment piece 46. In some embodiments, the hook 32 may be attached at the foot end and/or at a different end of the receptacle 30. In operation, the hook 32 may be utilized to hang the tub 10 after a bath to allow any residual water to drain from the tub 10, thus preventing unwanted water from accumulating and allowing the receptacle 30 to dry. For example, the hook 32 allows for the receptacle 30 to be hung on a shower rod or shower head to allow the receptacle 30 to dry after being used to bathe a child. In some embodiments, the hook 32 may be attached in a different location of the receptacle 30, and/or may be attached to allow more or less freedom of movement. In some embodiments, the receptacle 30 may not include a hook 32.

The tub receptacle may be utilized in at least two different configurations. In operation, a first configuration may be utilized by a parent to bathe an infant when the infant is very small and has little ability to support himself/herself. In that position, illustrated in FIG. 2, the sling 20 allows for the infant to "hover" over the water with little or no direct contact between the infant and the water, thus reducing drowning hazard and allowing a parent to bathe the infant conveniently and safely. The second configuration, as illustrated in FIG. 3, allows the infant to be partially submerged (e.g., a lower portion of the infant may be in contact with the water), while still allowing for support for the upper portion of the infant. Further, with the added support of the roll of the sling 20 around the bottom casing 70, as described below, the infant has additional support to stay in a safe position with less concern that the infant may slide into the water that may be in the receptacle 30. A third configuration may also be possible, wherein the infant is placed in the receptacle 30 without the sling, such as when the infant has grown and is able to better support himself/herself.

Figure 6C:
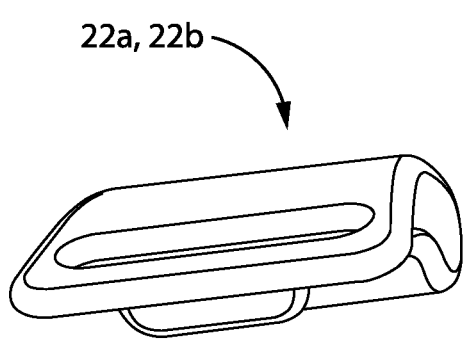
FIG. 6c is a first perspective view of the lower clips of the sling that is illustrated in FIG. 1.
Figure 6D:
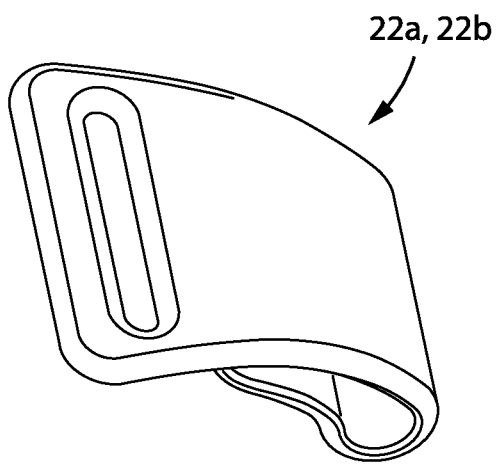
FIG. 6d is a second perspective view of the lower clips of the sling that is illustrated in FIG. 1.

Referring to FIG. 2, a perspective view of the tub in a first configuration is illustrated. The infant 1 is positioned on the sling 20 that is attached to the receptacle 30. The upper clips 22a and 22b are attached to the lip 42 of the receptacle 30 near the head end of the infant 1. Upper clips 22a, 22b are shown in greater detail in FIGS. 6c and 6d. The lower clips 24a and 24b are inserted into the first set of slots 36a and 36b. In this configuration, the bottom casing 70 of the sling 20 extends from the first left slot 36a to the first right slot 36b such that the bottom casing 70 is not in contact with the bottom of the receptacle 30. In this configuration, the infant 1 is fully supported by the sling 20 and is not directly supported by any portion of the receptacle 30.

Referring to FIG. 3, a perspective view of the tub receptacle in a second configuration is illustrated. The infant 1 is positioned with his/her upper body on the sling 20 and with his/her lower body supported at least partially by the bottom 54 of the receptacle 30. In this configuration, the bottom panel 72 of the sling 20 has been rolled around the bottom casing 70 and threaded through the loops, as described with respect to FIGS. 5a and 5b. As in the first configuration, the upper clips 22a and 22b are attached to the lip 42 of the receptacle 30 near the head end of the infant 1. However, as illustrated in FIG. 5c, the lower clips 24a and 24b of the sling 20 are inserted into the second set of slots 38a and 38b (and not the first set of slots 36a and 36b, which are unused in this configuration). In this second configuration, the infant 1 is partially supported by the upper portion of the sling 20, partially by the bottom 54, and has the added back support of the rolled bottom casing 70.

A first pair of slots 36a and 36b are positioned on the interior surface 44 of the receptacle 30 near the foot end 52 of the tub. First right slot 36b and first left slot 36a are molded into the interior surface 44 opposite each other (i.e., positioned on the right side 56 and left side 58 of the receptacle 30 at the same relative position) and act as receivers to allow for lower clips 24a, 24b, to be attached into the first slots, thus allowing the attached sling 20 to configured in a first configuration. In some embodiments, the sling 20 may instead include fastener receivers and the receptacle may include a protrusion similar in shape and function as clips 24a, 24b.

First left slot 36a and first right slot 36b are positioned opposite each other at a location that is closer to the foot end 52 of the receptacle 30 than the second pair of slots, second left slot 38a and second right slot 38b. The receptacle 30 is further illustrated with the upper clips 22a and 22b attached to the lip 42 at a location that is closer to the head end 50 of the receptacle 30 than the second pair of slots 38a and 38b. Stopper 34 is inserted into a hole in the bottom 54 that allows water to drain from the receptacle 30 after the bathing process is completed in order to allow the receptacle 30 to properly dry. The receptacle 30 includes a hook 32 that allows the receptacle 30 to be hung from a rod and/or other support during drying.

The first set of slots 36a and 36b, and the second set of slots 38a and 38b are configured to allow the same clips to be inserted in each. For example, first right slot 36b and second right slot 38b are both configured to receive and secure the same clip, such as lower clip 24b (as illustrated in FIGS. 6a and 6b). Similarly, first left slot 36a and second left slot 38a are both configured to receive and secure the same clip, such as lower clip 24a, 24b.

Figure 5A:
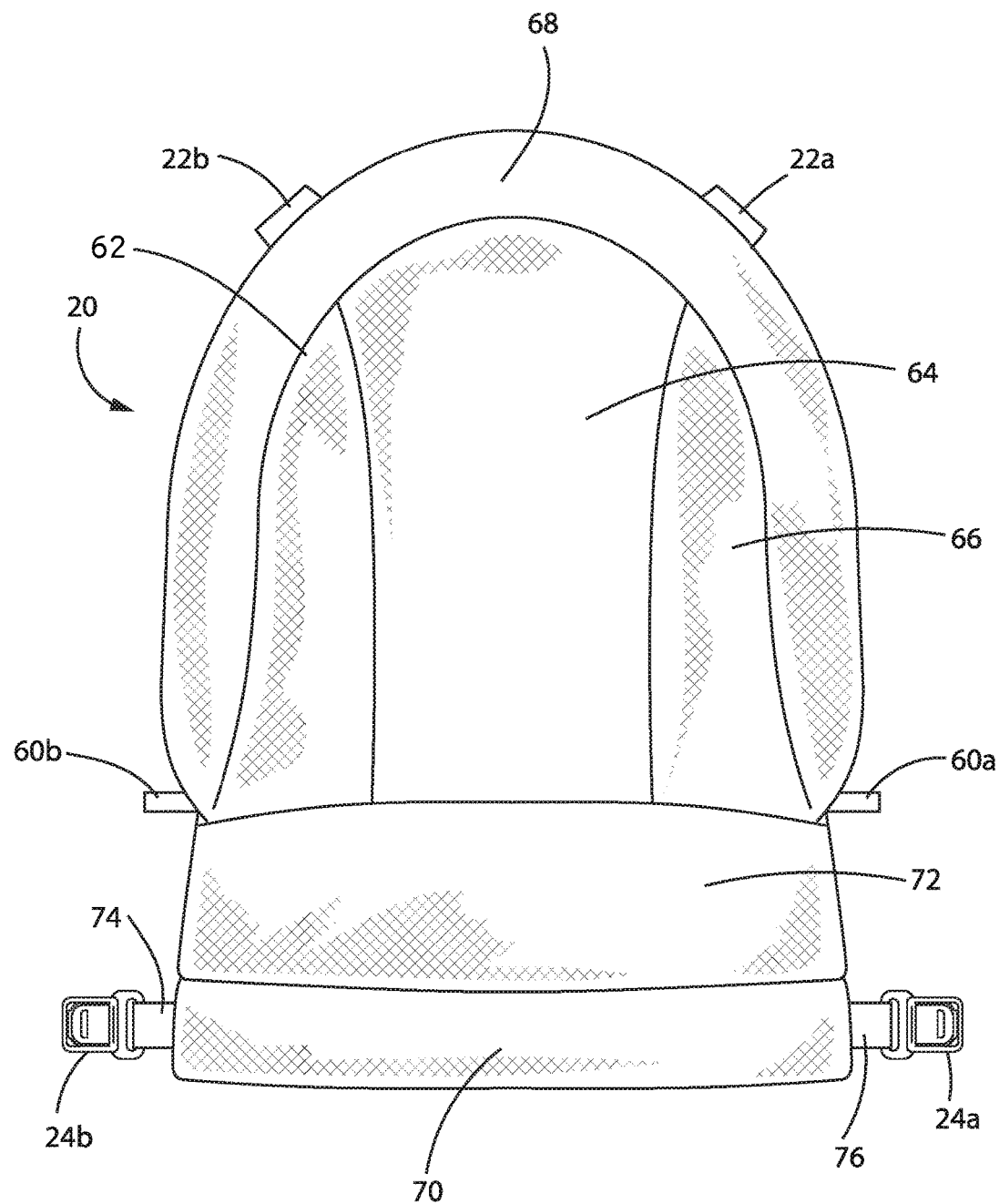
FIG. 5a is a front view of the sling that is illustrated in FIG. 1.
Figure 5B:
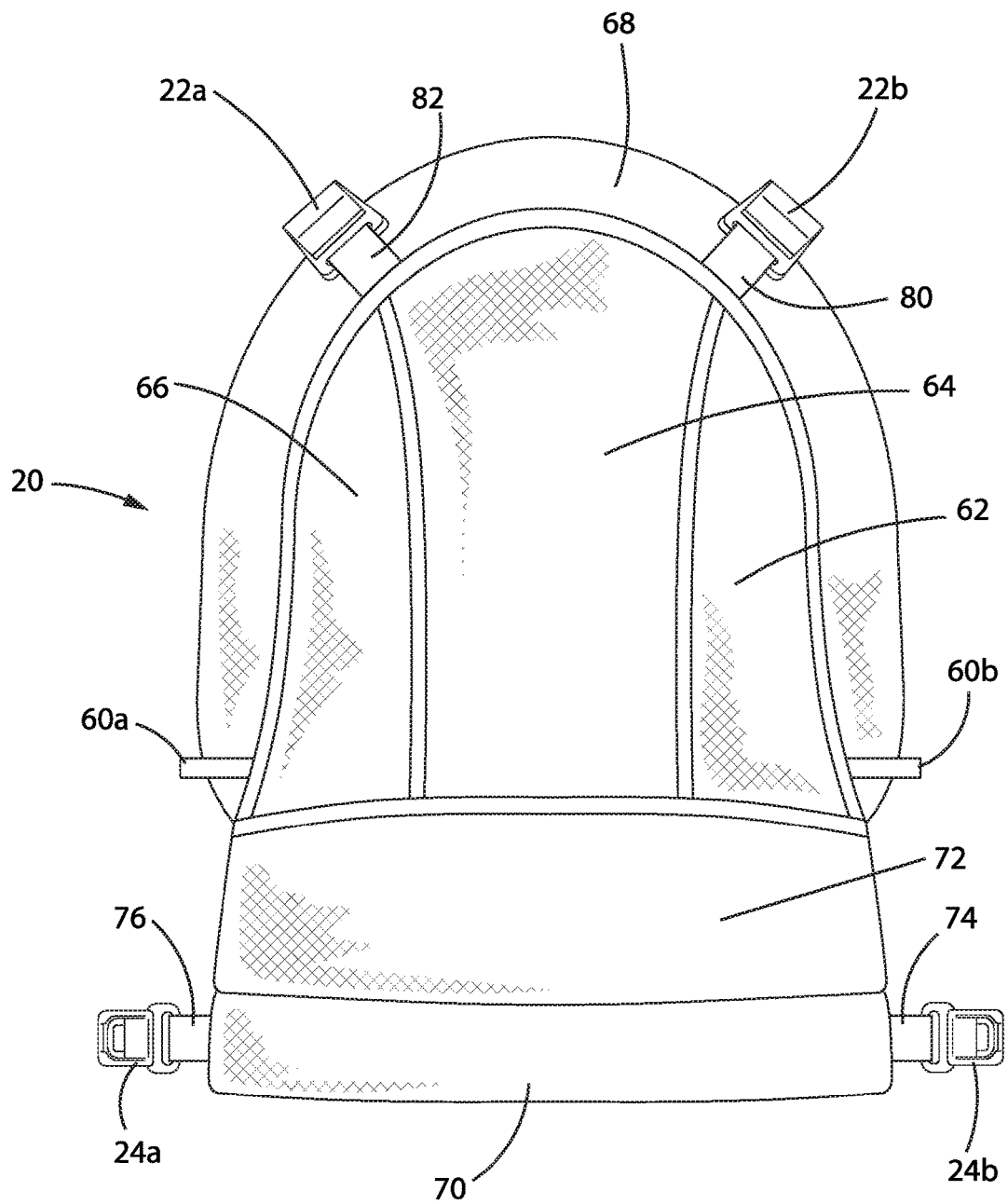
FIG. 5b is a back view of the sling that is illustrated in FIG. 1.
Figure 5C:
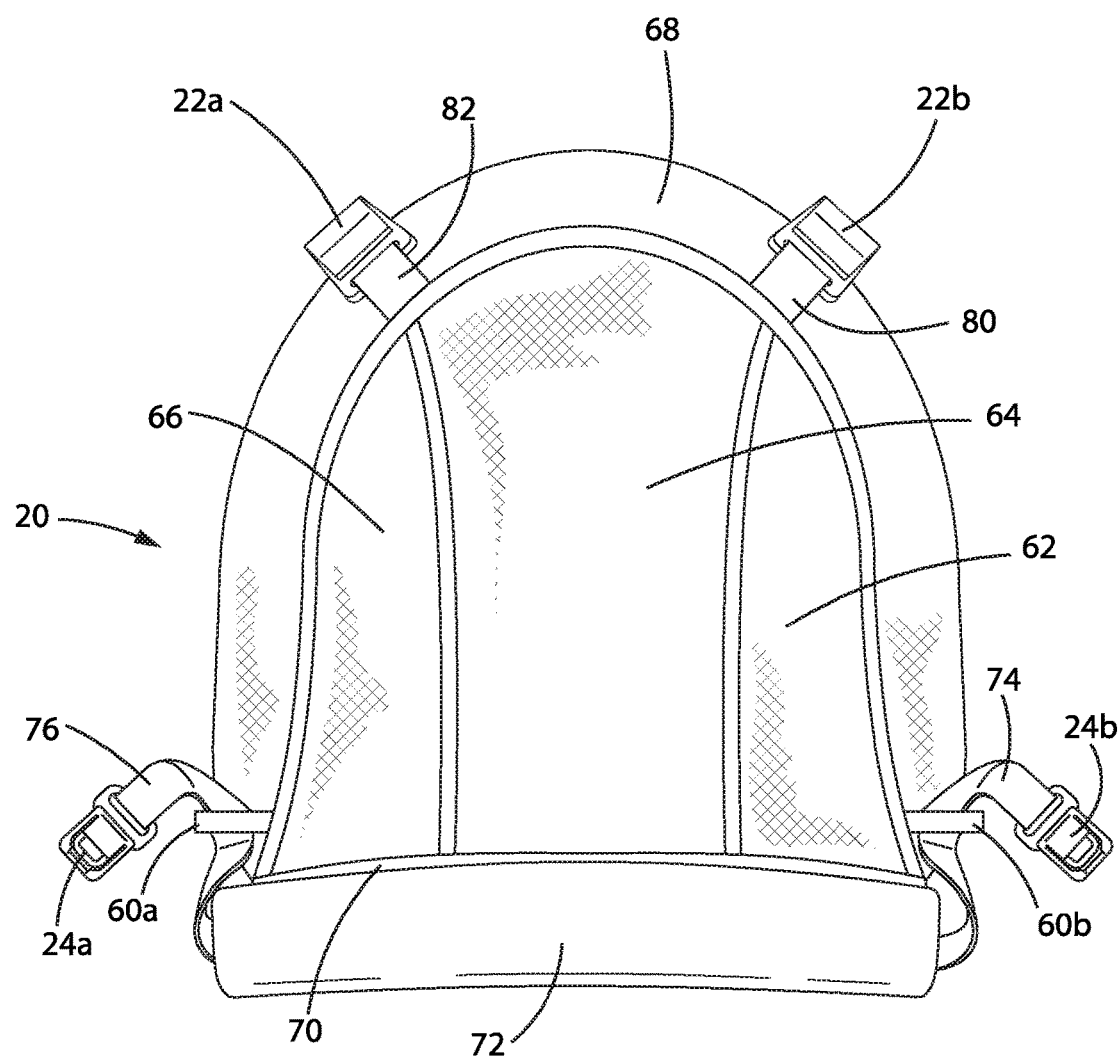
FIG. 5c is a front view of a second configuration of the sling that is illustrated in FIG. 1.

Referring to FIGS. 5a-5c, three views of the sling 20 are provided. FIG. 5a illustrates the front of the sling 20 (i.e., the side upon which an infant 1 would be placed). FIG. 5b illustrates the back of the sling 20 (i.e., the side of the sling 20 that would be facing the bottom 54 of the receptacle 30 when attached). FIG. 5c illustrates the back of the sling 20 as it would be used in a second configuration, with the lower clips 24a, 24b inserted into loops 60a, 60b. The sling 20 may be comprised of a number of mesh fabric panels, including center panel 64, side panels 62 and 66, and bottom panel 72. Further, sling 20 includes a head support cushion 68. When the sling 20 is secured to the receptacle 30, an infant may be placed in on the sling, with the infant's head toward the head support cushion 68 and feet toward bottom casing 70. The sling 20 may be secured to the receptacle 30 via lower clips 24a and 24b, and upper clips 22a and 22b.

The bottom casing 70 may be comprised of a firmer material than the sling 20 panels 62, 64, 66, and 72. For example, bottom casing 70 may be comprised of a solid foam tube and/or a hollow foam tube. Strap 76 secures lower clip 24a to the sling 20 and strap 74 secures lower clip 24b to the sling 20. In some embodiments, the straps may be secured directly to the sling 20. In some embodiments, the straps may be a single strap and may extend through the hollow center of the bottom casing 70. Upper clip 22a is secured to the sling 20 by strap 82 and upper clip 22b is secured to the sling 20 by strap 80.

Referring again to FIGS. 1 to 3, lower right clip 24b and lower left clip 24a attach to the receptacle 30 in one of two positions or configurations. In a first position, lower left clip 24a may be inserted into first left slot 36a and lower right clip 24b may be inserted into first right slot 36b. The clips are insertable such that they may temporarily be secured into position but may still be removable with little effort. Loops 60a and 60b are attached to the right edge and left edge of the sling 20. The loops 60a and 60b are positioned such that the fabric of the bottom panel 72 may be rolled around the bottom casing 70 at least one revolution. As illustrated in FIG. 5c, when the bottom panel 72 is rolled in this manner, the lower clips 24a and 24b are adjacent to the loops 60a and 60b. The loops 60a and 60b are sized to allow the lower clips 24a and 24b to fit through the loops 60a and 60b securely. For example, once the bottom panel 72 has been rolled around the bottom casing 70, lower left clip 24a may be inserted through loop 60a so that the loop 60a is around the strap 76. Lower clip 24b may be threaded through loop 60b in a similar manner.

One of ordinary skill in the art will recognize that additional embodiments are also possible without departing from the teachings of the presently-disclosed subject matter. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and can be made without departing from the spirit and scope of the presently-disclosed subject matter.

What is claimed is:

1. A tub, comprising:
   a tub receptacle comprising:
   a wall with an exterior surface and an interior surface, the wall defining a head end, a foot end, a right side, and a left side of the tub receptacle and constructed to receive a depth of water;
   a first pair of fasteners positioned on the right side and on the left side of the tub receptacle opposite each other and near the foot end of the tub receptacle;
   a second pair of fasteners positioned on the right side of the tub receptacle and on the left side of the tub receptacle opposite each other and located closer to the head end of the tub receptacle than the first pair of fasteners; and
   a sling, comprising:
   a sheet;
   a right upper fastener and a left upper fastener attached to the sheet and configured to attach to the wall near the head end of the tub receptacle; and
   a right lower complementary fastener and a left lower complementary fastener attached to the sheet, wherein the lower complementary fasteners are each adapted to selectively attach to the first pair of fasteners and the second pair of fasteners;
   wherein, in a first configuration, the lower complementary fasteners connect to the first pair of fasteners respectively, and the right upper fastener and left upper fastener of the sling are attached to the tub receptacle to thereby form a suspended sling over the tub receptacle; and
   wherein, in a second configuration, the lower complementary fasteners are connected to the second pair of fasteners, and the right upper fastener and left upper fastener of the sling are attached to the tub receptacle thereby forming a seat within the tub receptacle.

2. The tub of claim 1, wherein, in the second configuration, the sling further comprises:
   a right loop and a left loop attached to the sling adjacent to the right lower complementary fastener and the left lower complementary fastener, respectively;
   wherein the bottom of the sheet is rolled over towards the top of the sheet to form a back support roll, and wherein the right lower fastener is inserted into the right loop and the left lower fastener is inserted into the left loop before attaching the right lower fastener and the left lower fastener to the tub receptacle by the second pair of fasteners to form a back of the seat.

3. The tub of claim 1, wherein the right upper fastener and the left upper fastener are clips that attach to a lip of the wall when in the first configuration and the second configuration.

4. The tub of claim 1, wherein the second pair of fasteners are slots, and wherein the right lower complementary fastener and left lower complementary fastener are inserted into the slots when in the second configuration.

5. The tub of claim 4, wherein the first pair of fasteners are located on the interior wall of the tub receptacle, the second pair of fasteners are located on the interior wall of the tub receptacle and the second pair of fasteners are located near a base of the wall within the tub receptacle.

6. The tub of claim 1, wherein the sheet is a mesh fabric.

7. The tub of claim 6, wherein the mesh fabric is water permeable.

8. The tub of claim 1, wherein, in the second configuration, the bottom of the sheet of the sling is rolled over towards the top of the sheet and secured in place to the tub receptacle via the right lower fastener and the left lower fastener, to form a back of the seat.

* * * * *